Patented June 14, 1932

1,862,896

UNITED STATES PATENT OFFICE

MORRIS S. KHARASCH, OF CHICAGO, ILLINOIS

STABILIZED BACTERICIDE AND PROCESS OF STABILIZING IT

No Drawing.     Application filed August 22, 1931. Serial No. 558,830.

It is the object of my invention to stabilize certain alkyl mercuric sulphur compounds, which without such stabilization tend to form dissociation products.

The alkyl mercuric sulphur compounds to which my invention is directed are those of the following formula:

(1)   R—Hg—S—R$_{Ac}$—X in which R is an alkyl radical, R$_{Ac}$ is an organic radical containing an acid group which has a free valence bond capable of being attached either to hydrogen to form the corresponding acid or to a metal to form a salt of such acid, both the radical R and the radical R$_{Ac}$ have carbon atoms bonded directly to the mercury atom and to the sulphur atom respectively, and X is alkali metal or alkali-earth metal. Such compounds in general form the subject-matter of my Patent No. 1,672,615 granted June 5, 1928; and are effective antiseptics and bactericides, even in very high dilutions.

While my invention is directed broadly to the stabilization of compounds of the general character of Formula (1) above, and if the general character covered by my aforesaid prior patent, I will describe my invention more specifically in connection with that one of such compounds which is now in most general use. That is sodium ethyl mercurithiosalicylate, which is known on the market as "Merthiolate" and has the following formula:

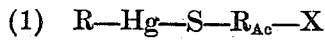

(2)   C$_2$H$_5$—Hg—S—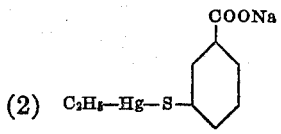

When compounds of the character of Formula (1) are in water solution, it is necessary to maintain the hydrogen ion concentration definitely on the alkaline side, conveniently between pH 8 and pH 10.5; as otherwise the corresponding acids may form a precipitate. To this end, it is desirable that the solution have a buffer, such as borax, to preserve its alkalinity. Further, it is usually desirable to make the solution substantially isotonic with the body fluids, as by the addition of an appropriate amount of sodium chloride.

When a water solution of a compound of the character shown in Formula (1) is first made, it is entirely bland, both to the skin and to the mucous membrane. However, it is found that on standing, for different lengths of time for the different compounds, the solution loses its blandness and acquires certain burning qualities; which make its use as an antiseptic and bactericide less pleasant.

These burning qualities are probably due to the presence of certain disproportionation products which are formed in the solution.

I have discovered that the compounds of the type shown in Formula (1) may be stabilized, and largely and wholly prevented from acquiring these unpleasant burning properties, by putting an anti-oxidant into the solution; such as a water-soluble aliphatic amine, for instance mono-ethanol amine, tri-ethanol amine di-n-butyl amine. Such an anti-oxidant serves to preserve the blandness of the solution. No exact quantity of the anti-oxidant is necessary; but I have found it effective to use about the same weight of it that is used of the alkyl mercuric sulphur compound.

The following is a preferred example of a stabilized solution of an alkyl mercuric sulphur compound. A solution is made of 10 grams of sodium ethyl mercurithiosalicylate in 10 liters of distilled water. To this are added about 10 grams of mono-ethanol amine; about 14 grams of borax, to produce and maintain a hydrogen ion concentration of about pH 8, and desirably about pH 9.5 to pH 10; and about 8 grams of sodium chloride, to make the solution substantially isotonic.

It is found that this solution, and others of the same general character within the scope of the present description and claims, may be preserved for long periods, with relatively little and often no acquisition by the solution of the burning qualities which make unpleasant similar solutions which lack the stabilizing amine.

While I have not definitely established any theory of the action of the amine in its stabilization effect, I have such a theory. The theory preceded the practice of the invention; and the success of the practice of the invention is an indication that the theory is correct. The theory is this:

When a solution of an alkali salt of an alkyl mercuric sulphur compound of the structure shown in Formula (1), such for instance as of sodium ethylmercurithiosalicylate, is allowed to stand, there is a dissociation of a few of the molecules at the bond between the sulphur and the ethyl mercury radical, producing a small quantity of resultant ions. In consequence an equilibrium mixture is produced in the solution, consisting of the undissociated compound with exceedingly small amounts of those two ions. This is shown by the equation:

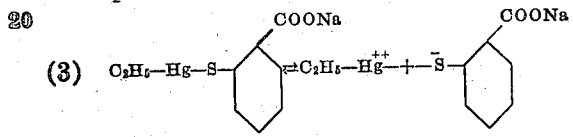

If no oxygen or other oxidizing agents, and no catalyst, were present, this equilibrium mixture would probably remain as such, without the production of any burning properties. However, on account of the invariable presence in the solution of oxygen, and of a catalyst, such as copper, the sulphur-containing ion, such as

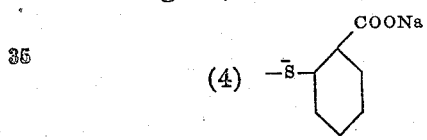

is oxidized to the di-thio compound, such as

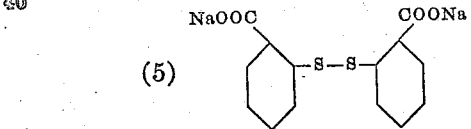

The formation of this di-thio compound removes these sulphur-containing ions from the equilibrium mixture above referred to, so that progressively more ionization of the alkyl mercuric sulphur compound occurs to maintain that equilibrium. This produces an excess of the mercury-containing ions such as

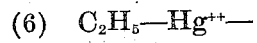

which react with the hydroxyl ions present in the solution to form

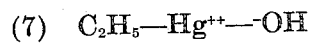

Products such as that shown in Formula (7) have been demonstrated to possess burning properties, and are the substances, I believe, which induce the burning properties in the class of substances shown by Formula (1).

The water-soluble aliphatic amines above described serve as anti-oxidants, or anti-catalysts, to prevent the formation of products such as are shown in Formulas (5) and (7) above; and therefore serve to stabilize the solution of the original alkyl mercuric sulphur compound of Formula (1), and largely and usually completely prevent such a solution from acquiring burning properties.

I claim as my invention:—

1. The process of stabilizing a water solution of a water-soluble alkyl mercuric salt in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which consists in adding to such solution an anti-oxidant which tends to inhibit the acquisition of burning properties by the solution.

2. The process of stabilizing a water solution of a water-soluble alkyl mercuric salt in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which consists in adding to such solution a water-soluble aliphatic amine.

3. The process of stabilizing a water solution of a water-soluble alkyl mercuric salt in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which consists in adding to such solution a water-soluble aliphatic amine, and maintaining the hydrogen ion concentration of such solution on the alkaline side of pH 8.

4. The process of stabilizing a water solution of a water-soluble alkyl mercuric salt in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which consists in adding mono-ethanol amine to such solution.

5. The process of stabilizing a water solution of sodium ethyl mercurithiosalicylate; which consists in adding to such solution an anti-oxidant which tends to inhibit the acquisition of burning properties by the solution.

6. The process of stabilizing a water solution of sodium ethyl mercurithiosalicylate; which consists in adding to such solution a water-soluble aliphatic amine.

7. The process of stabilizing a water solution of sodium ethyl mercurithiosalicylate; which consists in adding to such solution a water-soluble aliphatic amine, and maintaining the hydrogen ion concentration of such solution on the alkaline side of pH 8.

8. The process of stabilizing a water solution of sodium ethyl mercurithiosalicylate; which consists in adding mono-ethanol amine to such solution.

9. A stabilized solution of a water-soluble alkyl mercuric salt, in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which solution contains both said salt and an anti-oxidant which tends to inhibit the acquisition of burning properties by the solution.

10. A stabilized solution of a water-soluble alkyl mercuric salt, in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which solution contains both said salt and a water-soluble aliphatic amine.

11. A stabilized solution of a water-soluble alkyl mercuric salt, in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which solution contains both said salt and a substantially equal amount of a water-soluble aliphatic amine.

12. A stabilized solution of a water-soluble alkyl mercuric salt, in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which solution contains both said salt and a water-soluble aliphatic amine, and also a buffer compound to maintain the solution alkaline.

13. A stabilized solution of a water-soluble alkyl mercuric salt, in which one bond of the mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali or alkali-earth metal; which solution contains both said salt and a substantially equal amount of a water-soluble aliphatic amine, and also a buffer compound to maintain the solution alkaline.

14. A water solution containing sodium ethyl mercurithiosalicylate and an anti-oxidant which tends to inhibit the acquisition of burning properties by the solution.

15. A water solution containing sodium ethyl mercurithiosalicylate and a water-soluble aliphatic amine at a hydrogen ion concentration above pH 8.

16. A water solution containing sodium ethyl mercurithiosalicylate and mono-ethanol amine at a hydrogen ion concentration above pH 8.

17. A water solution containing sodium ethyl mercurithiosalicylate and a water-soluble aliphatic amine, and borax as a buffer.

18. A water solution containing sodium ethyl mercurithiosalicylate and mono-ethanol amine, and borax as a buffer.

19. A water solution containing sodium ethyl mercurithiosalicylate and mono-ethanol amine, borax as a buffer, and sufficient sodium chloride to make the solution substantially isotonic with the body fluids.

In witness whereof, I have hereunto set my hand at Chicago, Cook County, Illinois, this 18th day of August, 1931.

MORRIS S. KHARASCH.

Certificate of Correction

Patent No. 1,862,896.

June 14, 1932.

MORRIS S. KHARASCH

It is hereby certified that error appears in the printed specification of the above-numbered patent requiring correction as follows: Page 1, lines 35 to 39 inclusive, strike out the formula and insert instead:

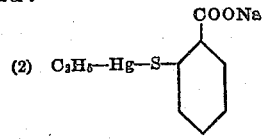

and that the said Letters Patent should be read with this correction therein that the same may conform to the record of the case in the Patent Office.

Signed and sealed this 29th day of August, A. D. 1933.

[SEAL.]

M. J. MOORE,
*Acting Commissioner of Patents.*